United States Patent

[11] 3,619,220

| [72] | Inventor | Galeb H. Maher |
| | | Adams, Mass. |
| [21] | Appl. No. | 767,046 |
| [22] | Filed | Sept. 26, 1968 |
| [45] | Patented | Nov. 9, 1971 |
| [73] | Assignee | Sprague Electric Company |
| | | North Adams, Mass. |
| | | Continuation-in-part of application Ser. No. 626,245, Mar. 27, 1967, now abandoned. |

[54] LOW TEMPERATURE FIRED, GLASS BONDED, DIELECTRIC CERAMIC BODY AND METHOD
10 Claims, 3 Drawing Figs.

[52] U.S. Cl. .................................................. 106/39 R,
106/46, 106/49, 264/61
[51] Int. Cl. .................................................. C04b 33/00
[50] Field of Search ........................................... 106/39, 46,
49; 65/18; 317/258, 261; 336/200; 264/61

[56] References Cited
UNITED STATES PATENTS
2,385,580  9/1945  Knox ............................. 106/49
3,293,077  12/1966  Kaiser et al. ................... 65/18 X Primary Examiner—Tobias E. Levow
Assistant Examiner—W. R. Satterfield
Attorneys—Connolly and Hutz, Vincent H. Sweeney, James Paul O'Sullivan and David R. Thornton ABSTRACT: Combining a high temperature prefired ceramic powder with a low firing temperature ceramic powder; forming a slip or paste suspension of the powder combination, drying and firing the combination between the softening temperature of the low firing ceramic powder and the temperature where gravitational forces overcome the cohesive force between the molten low temperature powder and the high temperature powder. Preparing capacitors, resistors, inductors, etc. employing the low temperature fired ceramic body.

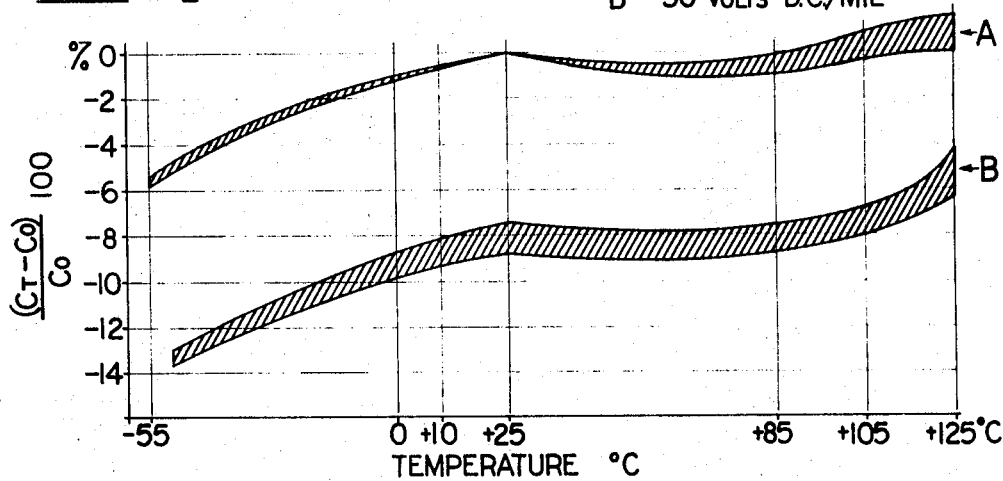
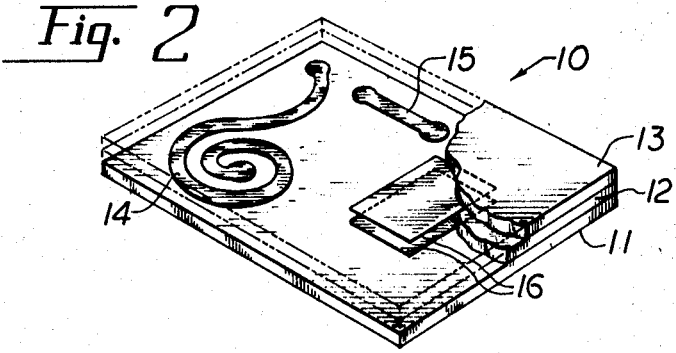
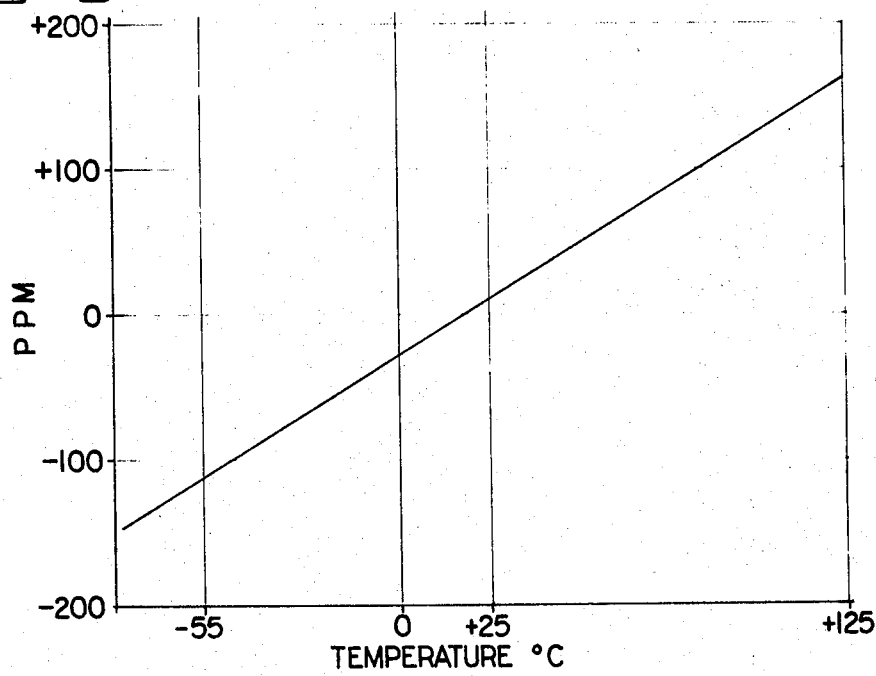

LOW TEMPERATURE FIRED, GLASS BONDED, DIELECTRIC CERAMIC BODY AND METHOD

CROSS-REFERENCE TO RELATED APPLICATION

This application is a continuation-in-part of U.S. Pat. application 626,245 filed Mar. 27, 1967, now abandoned.

BACKGROUND OF THE INVENTION

This application pertains to a low temperature fired ceramic body, components containing said body and process for forming same.

Conventional inert compositions must be fired to maturity at comparatively high temperatures, i.e. above 2,200° F. When a multilayered capacitor employing a high temperature ceramic is formed, the electrodes must be high melting and insert under the capacitor forming conditions. Palladium, one of the platinum group materials employed as the electrode material in this type of capacitor, presently sells for about $30 per ounce. If the capacitor formation temperature can be reduced significantly, without greatly sacrificing capacitance per volume, the less expensive electrode materials, such as silver ($1.30 per ounce) or silver-palladium alloy, can be employed.

SUMMARY OF THE INVENTION

The invention is concerned with a low temperature fired ceramic body comprising a high temperature prefired ceramic material which matures above 2,000° F. in combination with a low temperature ceramic material which softens or is workable between 1,100° F. –1,500° F. The high temperature prefired ceramic is a member of the group consisting of titanates, zirconates, niobates, alumina, stannates, rare earth oxides, and mixtures thereof. The low temperature ceramic consists essentially of:

| | | | |
|---|---|---|---|
| CdO | 20–40% | $Al_2O_3$ | 0–2% |
| $Bi_2O_3$ | 18–32% | $B_2O_3$ | 0–8% |
| PbO | 16–35% | $SiO_2$ | 0–8% |
| ZnO | 0–7.5% | CaO | 0–8% |

A preferred prefired ceramic is a barium titanate and the preferred low temperature ceramic consists essentially of CdO 36%; $Bi_2O_3$ 23%; PbO 25%; ZnO 5%; $Al_2O_3$ 1%; $B_2O_3$ 5%; and $SiO_2$ 5%. By the term "a barium titanate" is meant either pure barium titanate, barium titanate doped with known prior art additives or mixtures of barium titanate with other prior art ceramic constituents.

It is to be understood that the principal advantages of the present invention can be obtained by employing as the low firing temperature ceramic one containing only cadmium oxide, bismuth oxide, lead oxide and at least one of the glass forming oxides ($B_2O_3$ and/or $SiO_2$). Optimum characteristics, however, are obtained by the inclusion of preferred proportions of the other oxides listed above.

The method of forming the low temperature fired body involves combining the high temperature prefired ceramic powder with the low firing ceramic powder; forming a slip suspension or a paste of the powder combination in a suitable vehicle and firing the combination. The firing temperature is between the softening temperature of the low firing ceramic powder and the temperature where gravitational forces overcome the cohesive force between the molten low firing powder and the nonmolten high temperature powder. The low firing ceramic composition of the present invention can be employed in forming capacitors, resistors, thermistors, etc. which utilize electrode, resistor and thermistor films of low sintering or low firing temperature materials such as gold, silver, copper, certain silver-palladium alloys, alloys of any combination thereof, etc.

An electrical component comprising the low temperature fired ceramic body of the present invention will consist essentially of a high temperature prefired ceramic material which matures above 2,000° F. in combination with a low temperature ceramic material which softens between 1,100°–1,500° F. and at least one metallic film located within said ceramic body. The metallic film can be a resistance material, a planar inductance coil, or when at least two metallic films are within said body separated by a layer of said ceramic, the structure will define a capacitor. The component obviously may include all three electrical components.

It is an object of the present invention to form a low firing temperature ceramic body.

It is further an object of the present invention to present a dielectric material which can be fired to maturity in the presence of low sintering or firing temperature electrodes, resistor films, or thermistor films.

It is another object of the present invention to present a low firing temperature ceramic body which is the result of a surface reaction between the high firing temperature powder and the low firing temperature powder.

It is still another object of the present invention to present a low firing temperature ceramic body which comprises two or more different high firing temperature ceramic powders which are surface reacted with the low firing temperature powder.

It is yet another object to present a process for preparing a low firing temperature ceramic.

Still another object is to present an electrical component employing the low firing temperature ceramic in conjunction with low sintering conductive material.

BRIEF DESCRIPTION OF THE DRAWING

FIG. 1 shows the TC curves of the units of example II of the present invention. Curve A was at zero voltage and curve B was at 50VDC.

FIG. 2 illustrates an electrical component within the scope of the present invention.

FIG. 3 is a graph showing the TCR of the resistor of example III.

DETAILED DESCRIPTION OF THE INVENTION

Example I

A. Barium titanate powder was fired in a sagger at 2,550° F. and soaked for 1 hour at this temperature. The matured powder was crushed and pulverized to approximately 1–5 mils in particle size. A deionized water-barium titanate powder mixture, containing about 70 percent of the latter was milled for 15 hours to achieve a particle size of less than 5 microns. The milled mixture was then dried and granulated. The dielectric constant of the prefired barium titanate extrapolated to 100 percent density was about 500.

B. A prereacted ceramic composition consisting essentially of CdO 36%, $Bi_2O_3$ 23%, PbO 25%, ZnO 5%, $Al_2O_3$ 1%, $B_2O_3$ 5% and $SiO_2$ 5% was mixed with deionized water so that the mixture was about 70 percent solids. This mixture was milled for about 15 hours to achieve a particle size of less than 1 micron. The mixture was then dried and granulated. The dielectric constant of this composition was about 18.

C. Fifty-five percent by volume of the barium titanate formed as in paragraph A was mixed with 45 percent by volume of the ceramic of paragraph B. This mixture was dispersed in beta terpineol so that the dispersion contained about 85 percent by weight of solids. The blend was milled for about 12 hours to insure a homogeneous mixture, and, to a certain degree, to electrostatically coat the high temperature powder with the low temperature powder since they exhibit opposite charges. About 7 percent by weight of ethyl cellulose was carefully mixed in as a binder.

Several layers of this slip were deposited on a glass plate and fired to 1,400° F. for about 2 hours with at least a 30-minute soak at the peak temperature. The fired dielectric thickness was about 1 mil. The dielectric constant of the ceramic composition was about 350.

Example II

A series of four-plate multilayer capacitors were prepared employing the dielectric composition of example I. The capacitors consisted of five, 1 mil dielectric layers and one, 2 mil layer. The electrodes were formed from a screenable silver paint. The units were then fired to 1400° F. in a 2 hour cycle with a 30-minute soak at the peak temperature. The fired dielectric thickness of the layers ranged between 0.85 to 1.2 mils. The average capacitance was 7,500 pf. at 1 kilohertz and 2.0 VAC. The dissipation factor averaged approximately 1 percent at 1 kilohertz and at 2.0 VAC the dielectric constant was approximately 350. The insulation resistance was over $10^{11}$ ohms.

These capacitors were life tested at 100 VDC/mil at 125° F. for 1,500 hours with no failures out of 25 units tested. The insulation resistance after test at 100 VDC/mil at 25° C. was over $10^{11}$ ohms. The dielectric constant after test decreased by about 9 percent.

The curves of FIG. 1 illustrate that capacitors employing the ceramic of the present invention exhibit superior temperature coefficient characteristics.

In forming a resistor, any of the well-known resistor inks can be employed providing the firing temperature is compatible with the firing temperature of the ceramic substrate. The manufacture of the resistor is very similar to that of the capacitor. The low firing temperature ceramic slip or paste can be sprayed, screened, or drawn on a temporary substrate to any desired thickness. A metal resistor ink can be screened on in any desired pattern and a top layer of the low firing temperature slip applied over the resistor ink.

The resistor can be cut to the desired size in the green state and silver terminal pick-ups applied. Thereafter, the units can be fired within the proper temperature range.

Example III

To exemplify the monolithic resistor, components were made employing the body of example I and a resistor ink compound consisting of a PdO-Ag-glass frit system. The resistor was made as described above, with a single film of one-half mil in thickness. The resistors were fired at 1,400° F. for a 2 hour cycle with a one-half hour soak at this peak temperature. The resistivity on three different samples averaged about 20 ohms per square. The normal resistivity of this ink when employed on a fired substrate of the same thickness ranged about 10 to 12 kilohms per square. The reason for the decrease in resistivity can be explained by the fact that in a monolithic form, the unit shrinks linearly about 20 percent after firing, and thus produces a considerable compression of the resistor film. The TCR of the resistor of the present invention is quite linear as shown by FIG. 3. The TCR of the same ink used in normal fashion on a fired substrate is of a parabolic nature with ±200 p.p.m. at either temperature extreme.

To obtain a higher resistance, the film thickness can be changed, or the ratio of PdO-Ag-glass frit can easily be altered to obtain the desired resistance value.

In forming an inductor, the same low firing temperature ceramic body can be employed and it may or may not contain ferroelectric material. For example, an alumina system would be employed for a nonferroelectric body and a barium titanate system would be employed for a ferroelectric system. For a much higher inductance a ferrite or high ferromagnetic system can be employed. A coil pattern of silver, gold, silver-palladium alloys, etc., can be screened on the substrate while it is in the green state and then a top layer of the inventive composition can be applied to form a monolithic inductor.

FIG. 2 shows a microcircuit 10 having ceramic layers 11, 12 and 13 composed of the low firing temperature ceramic of the present invention. Positioned between layers 11 and 12 are an inductor 14 and a resistor 15. Disposed on opposite sides of a section of ceramic layer 12 are two electrodes 16 which together with the ceramic form a capacitor.

Barium titanate exemplifies the high firing temperature ceramic material. Other high firing temperature materials are alkaline earth metal titanates, zirconates, niobates, alumina, stannates, rare earth oxides and mixtures thereof. The low firing temperature body will have the ingredients recited in example I and optionally may contain CaO. While example I recites the preferred percentages of the oxides in the low temperature frit, the frit material can have the following percentage ranges:

| | | | |
|---|---|---|---|
| CdO | 20–40% | $Al_2O_3$ | 0–2% |
| $Bi_2O_3$ | 18–32% | $B_2O_3$ | 0–8% |
| PbO | 16–35% | $SiO_2$ | 0–8% |
| ZnO | 0–7.5% | CaO | 0–5% |

With no intention of being bound by any theory, the invention presents certain data and observations which tend to indicate that the ceramic composition of the present invention is something other than a simple mixture of the low and high firing temperature material.

The dielectric constant of the composition of example I is about 350. The dielectric constant of the pure barium titanate of the composition in the green state, extrapolated for 100 percent density, is about 500. The dielectric constant of the ceramic material of paragraph B of example I is about 18. Employing the empirical formula of a recently proposed mixing rule, (see R. M. Gruver et al., Technical Report AFML-TR-66-164, May, 1966, page 57, equation 8) the calculated dielectric constant would be expected to be about 190. The fact that it is actually about 350 is an indication that the composition is something other than a simple mixture.

Two samples (one a fired barium titanate and the other the same barium titanate mixed with the composition of paragraph B of example I of the present invention) were prepared for microscopic observation. Both samples were thermally etched at 100° F. below their respective firing temperatures. High magnification photomicrographs show that the basic barium titanate crystals are still present, but there appears to be a significant variation in the crystal boundaries of the second sample which suggests the presence of a surface reaction and a new phase.

Perhaps one of the most convincing reasons to believe that a reaction takes place between the surface of the high firing temperature ceramic and the low firing temperature ceramic may be seen from the observed thermal conductivity of a composition composed of a 1 to 1 ratio by volume of alumina and the low firing temperature material of paragraph B of example I, in comparison with a 1 to 1 ratio by volume of an alumina silicate mixture. The alumina-silicate system had only 12.5 percent the thermal conductivity of pure alumina and 180 percent the conductivity of the pure silicate. On the other hand, the alumina glass system of the present invention had 41 percent the conductivity of pure alumina and 1,600 percent the conductivity of the low firing temperature glass of example I. If the composition of the present invention were a mere mixture, the thermal conductivity would have been quite close to that of the low firing temperature ceramic.

The specific examples above, all employ a composition having about 55 percent by volume of the high temperature ceramic and 45 percent by volume of the low firing temperature ceramic. It is to be understood, however, that the proportion of high temperature ceramic to low firing ceramic in the composition, can range from 10 percent to 95 percent of the former and 5 percent to 90 percent of the latter. The particular firing temperature necessary to convert the powder mixture into an effective ceramic body will depend upon the proportion of high temperature ceramic powder to the low firing ceramic powder. The dielectric constant and some of the electrical properties will vary accordingly. The following shows the broad firing ranges of the different combinations.

| % by volume high temp. prefired ceramic | % by volume low firing temp. ceramic | Firing Range |
|---|---|---|

| | | |
|---|---|---|
| 10–65 | 90–35 | 1200° F. to 1750° F. |
| 65–95 | 35–5 | 1750° F. to 2200° F. |

By way of illustration:

1. A composition having 25 percent by volume of ceramic BaTiO$_3$ powder and 75 percent by volume of the above-identified low firing ceramic, fires at a temperature of about 1,200° F. The dielectric constant is about 125.

2. A composition having 55 percent of the ceramic BaTiO$_3$ and 45 percent of the low firing ceramic, fires between 1,375° F. and 1,500° F. to yield a body having a dielectric constant of 350.

3. Employing 70 percent of the ceramic powder (BaTiO$_3$) and 30 percent of the low firing powder, the resulting ceramic body will fire to maturity between 1,750° F. and 1,950° F. and have a dielectric constant of about 1,000.

4. A composition having 80 percent by volume of prefired ceramic powder and 20 percent by volume of the low firing material will yield on firing between 1,900° F. to 2,000° F., a body having a dielectric constant of about 1,450.

5. A composition having 90 percent by volume BaTiO$_3$ ceramic powder and 10 percent by volume of the above-identified low firing powder, will yield on firing between 2,000° F. to 2,100° F., a body having a dielectric constant of from 1,550 to 1,600.

In example 5 above, the optimum firing temperature of the composition is 2,050° F. with a 1 hour soak at this temperature. The apparent dielectric constant of this body was calculated to be 1,550 at 1 kHz. and 1 VAC per mil when measured at 25° C. The dissipation factor at the above measurements was 1.5–1.7 percent. The temperature coefficient characteristics of this composite showed a variation of ±10 percent change in capacitance over the range −55° C. to 125° C. at zero VDC. When 50 VDC per mil was applied the percent change in capacitance was less than 20 percent throughout the range −55° C. to 125° C.

A preferred electrode system to be used with the ceramic bodies of the present invention can be either silver for the lower firing bodies, a 5–40 percent palladium alloyed with silver, or any other alloy which fires in the proper firing range.

As is evident from the foregoing, the invention is not to be limited to formation of the rather specific illustrative examples. Modifications and variations, as well as the substitution of equivalents may be made without departing from the spirit and scope of the invention as defined in the appended claims.

I claim:

1. A low temperature fired ceramic body consisting essentially of a high temperature prefired ceramic material selected from the group consisting of titanates, alumina, and mixtures thereof, which matures above 2,000° F. in the form of dielectric particles and a low temperature ceramic material which softens between 1,100° F. and 1,500° F. and wherein said low temperature ceramic material consists essentially of:

| | | | |
|---|---|---|---|
| CdO | 20–40% | Al$_2$O$_3$ | 0–2% |
| Bi$_2$O$_3$ | 18–32% | B$_2$O$_3$ | 0–8% |
| PbO | 16–35% | SiO$_2$ | 0–8% |
| ZnO | 0–7.5% | CaO | 0–5% | and wherein said high temperature prefired ceramic material is present in from 10–95 percent by volume of said body and said low temperature ceramic material is present in from 5–90 percent by volume of said body and said particles are surface reacted at a temperature between 1,200°–2,200° F. with said low temperature ceramic.

2. The ceramic body of claim 1 wherein said high temperature prefired ceramic material is present in from 50–60 percent by volume of said body and said low temperature ceramic material is present in from 50–40 percent by volume of said body.

3. The ceramic body of claim 1 wherein said high temperature prefired ceramic material is present in from 80–90 percent by volume of said body and said low temperature ceramic material is present in from 20–10 percent by volume of said body.

4. The ceramic body of claim 1 wherein the low temperature ceramic consists essentially of:

| | | | |
|---|---|---|---|
| CdO | 36% | Al$_2$O$_3$ | 1% |
| Bi$_2$O$_3$ | 23% | B$_2$O$_3$ | 5% |
| PbO | 25% | SiO$_2$ | 5% |

ZnO 5%

5. The ceramic body of claim 4 wherein the high temperature prefired ceramic is a barium titanate.

6. A method of forming a low temperature fired body comprising combining a high temperature prefired ceramic powder which matures above 2,000° F., consisting essentially of a member selected from the group consisting of titanates, alumina, and mixtures thereof, from 10–95 percent by volume of a titanate ceramic material in the form of dielectric particles prefired at a temperature above 2,000° F., with 5–90 percent by volume of a low temperature ceramic material which softens between 1,100° F.–1,500° F., wherein said low temperature ceramic material consists essentially of:

| | | | |
|---|---|---|---|
| CdO | 20–40% | Al$_2$O$_3$ | 0–2% |
| Bi$_2$O$_3$ | 18–32% | B$_2$O$_3$ | 0–8% |
| PbO | 16–35% | SiO$_2$ | 0–8% |
| ZnO | 0–7.5% | CaO | 0–5% | forming a suspension or paste of the powder combination in a suitable vehicle and firing the combination at a temperature between about 1,200° F. to 2,200° F. and surface reacting said titanate particles with said low temperature ceramic.

7. The method of claim 6 wherein said high temperature prefired ceramic material is present in from 10–65 percent by volume and said low temperature ceramic material is present in from 90 to 35 percent by volume and wherein said firing range is between from 1,200° F. to 1,750° F.

8. The method of claim 6 wherein said high temperature prefired ceramic material is present in from 65 to 95 percent by volume and said low temperature ceramic material is present in from 35–5 percent by volume and wherein said firing range is between about 1,750° F. to 2,200° F.

9. The method of claim 6 wherein the low temperature ceramic consists essentially of:

| | | | |
|---|---|---|---|
| CdO | 36% | Al$_2$O$_3$ | 1% |
| Bi$_2$O$_3$ | 23% | B$_2$O$_3$ | 5% |
| PbO | 25% | SiO$_2$ | 5% |

ZnO 5%

10. The method of claim 9 wherein said high temperature prefired material is a barium titanate.

* * * * *